(12) United States Patent
Ootaka et al.

(10) Patent No.: US 6,679,292 B2
(45) Date of Patent: Jan. 20, 2004

(54) TANK FITTING STRUCTURE FOR FUEL PUMP

(75) Inventors: Toshihiro Ootaka, Saitama (JP); Yoshio Takada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 169 days.

(21) Appl. No.: 10/052,436

(22) Filed: Jan. 23, 2002

(65) Prior Publication Data

US 2002/0108658 A1 Aug. 15, 2002

(30) Foreign Application Priority Data

Jan. 23, 2001 (JP) ......................................... 2001-015012

(51) Int. Cl.[7] .......................... F02M 37/10; F04B 41/02
(52) U.S. Cl. .................................. 137/565.17; 123/509
(58) Field of Search ..................... 137/565.17; 123/509; 280/830

(56) References Cited

U.S. PATENT DOCUMENTS

| | | | | |
|---|---|---|---|---|
| 3,659,965 A | * | 5/1972 | Ebert et al. .................. | 417/363 |
| 4,306,844 A | * | 12/1981 | Otto et al. ............. | 417/423.14 |
| 4,590,964 A | * | 5/1986 | Beardmore ................. | 137/565 |
| 4,591,319 A | * | 5/1986 | Takahashi et al. .......... | 417/360 |
| 4,865,522 A | * | 9/1989 | Radermacher .............. | 417/203 |
| 4,961,693 A | * | 10/1990 | Hoover et al. .............. | 417/363 |
| 5,482,444 A | * | 1/1996 | Coha et al. .................. | 417/363 |
| 5,649,514 A | * | 7/1997 | Okada et al. ................ | 123/514 |
| 5,951,050 A | * | 9/1999 | Siekmann .................... | 280/830 |
| 6,073,614 A | * | 6/2000 | Kleppner ..................... | 123/509 |
| 6,125,825 A | * | 10/2000 | Sanchez et al. ............. | 123/509 |
| 6,182,693 B1 | * | 2/2001 | Stack et al. ............ | 137/565.17 |
| 6,253,790 B1 | * | 7/2001 | Hara ...................... | 137/565.17 |
| 6,378,504 B1 | * | 4/2002 | Horiuchi et al. ............ | 123/509 |
| 6,401,750 B2 | * | 6/2002 | Tokunaga .................... | 123/509 |
| 6,405,717 B1 | * | 6/2002 | Beyer et al. ................. | 123/509 |
| 6,588,451 B2 | * | 7/2003 | Kuroshita et al. ...... | 137/565.17 |

FOREIGN PATENT DOCUMENTS

JP          8-232792           9/1996

* cited by examiner

*Primary Examiner*—John Fox
(74) *Attorney, Agent, or Firm*—Birch, Stewart, Kolasch & Birch, LLP

(57) ABSTRACT

A fitting structure for attaching a fuel pump in a fuel tank, which includes a gasket surrounding a pump insertion hole of the fuel tank. The gasket is collapsed by a presser ring through a flange portion of the fuel pump, thus enabling the gasket to provide an effective seal between the fuel pump and the fuel tank. A nut fastened onto a bolt is used to bring a second valley portion of the presser ring into close contact with a first mount portion of a fixed side ring that has been preliminarily welded to the fuel tank, thus securely fitting the fuel pump to the fuel tank. As compared with a conventional fitting structure using a bayonet or snap fit connection, wherein the fitting structure must be turned against the gasket to be fitted into a secure position, this new fitting structure presses the gasket into place, thus avoiding the turning motion and the resulting damage that may be caused to the gasket. In addition, the new structure eliminates the possibility of applying excessive compression force to the flange portion of the fuel pump, thus preventing the possibility of causing creep distortion to the flange portion, even when the flange portion is made of a light-weight resin.

11 Claims, 10 Drawing Sheets

TANK FITTING STRUCTURE FOR FUEL PUMP

BACKGROUND OF THE INVENTION

1. Field of the Invention

The present invention relates to an improvement in a tank fitting structure for a fuel pump.

2. Description of Background Art

FIG. 4 of Japanese Pre-examination Patent Publication (KOKAI) No. 8-232792 (1996) "In-tank Type Fuel Pump Device" shows an in-tank type fuel pump 2 fitted to a fuel tank 1 (the symbols and the numerals used in the No. 8-232792 publication are the same as those used in disclosure of the present invention that follows). A fitting structure consisting of flange 24 of in-tank type fuel pump 2 is shown in detail in FIG. 31 of the publication. FIG. 31 of this publication is reprinted as FIG. 14 herein. The structure shown is described in detail below.

FIGS. 14(a) to 14(c) reprints FIG. 31 of the Japanese Pre-examination Patent Publication (KOKAI) No. 8-232792 (1996), in which 14(c) coincides with FIG. 31, and 14(a) and 14(b) are illustrations of mounting to obtain 14(c).

In FIG. 14(a), presser claw 102 is preliminarily fitted to an edge of pump insertion hole 101 of fuel tank 100, and gasket 103 is positioned on the edge of the pump insertion hole 101. Earth minus terminal 106 is fitted to rib 105 which droops down from flange 104 of the pump. Flange 104 is positioned on the gasket 103 (arrow ①).

FIG. 14(b) shows the condition where flange 104 is positioned on gasket 103, and, while pushing flange 104 as indicated by the downward arrow, stopper metal 107 is lowered to a side of presser claw 102 as indicated by arrow ②. The stopper metal 107 is turned as indicated by arrow ③, whereby stopper metal 107 is hooked under presser claw 102.

FIG. 14(c) shows completion of mounting, in which gasket 103 causes a pushing up force on flange 104. By pressing flange 104 against stopper metal 107, flange 104 is fitted and sealed to fuel tank 100.

The connecting structure created as described above by turning and hooking the stopper metal 107 onto the presser claw 102 on the fixed side is called a snap fit or a bayonet connection. Snap fit and bayonet connections are simple connecting methods and are widely adopted.

However, as is clear from FIG. 14(c), the simple structure leads to dispersion in the collapsing amount of gasket 103. Furthermore, problems exist with snap fit and bayonet connections in the case of, for example, autobicycles which are subject to large vibrations.

One way to address the above issues, may be to consider increasing the size of gasket 103 to increase the collapsing allowance, or to form gasket 103 from a hard material to enhance the spring coefficient. However, with this approach, the pressing force indicated by the downward arrow in FIG. 14(b) would have to be increased, requiring presser claw 102 and stopper metal 107 to be made more rigid, leading to an increase in parts cost. In addition, the turning torque of stopper metal 107 indicated by arrow ③ in FIG. 14(b) would have to be increased, making the work of fitting the fuel pump to the tank more difficult.

Further, for lightness in weight and corrosion resistance, flange 104 may sometimes be made of a resin. Resins suffer from deformation called creep when being compressed by a high pressure for a long time. Therefore, increasing the pressing force is not desirable.

Also, when designing a fuel tank for an autobicycle, in many cases the pump unit is inserted into a tank bottom upwards from the lower side, and then fixed to the tank. In such a case, the center of gravity of the pump unit is above the flange, causing a large force to be exerted on the flange at the time of lateral turning. Thus, snap fit or bayonet connections are generally not suitable for such use.

As described above, pump fitting structures according to the prior art are not suitable for vehicles receiving large vibrations such as an autobicycle. Thus, it is the object of the present invention to provide a fitting structure for a fuel pump which replaces the snap fit or bayonet connection.

SUMMARY AND OBJECTS OF THE INVENTION

In order to attain the above object, the present invention includes a gasket that is positioned on an edge of a pump insertion hole provided in a fuel tank. A fixed side ring is preliminarily fitted to the fuel tank at a position for surrounding the gasket, and major part of a pump unit, is inserted into the fuel tank through the pump insertion hole while placing a flange portion projected from the pump unit on the gasket. The inside surface of a presser ring is positioned on the flange portion, and the outside surface of the presser ring faces the fixed side ring. Further, the outside surface of the presser ring is brought into close contact with the fixed side ring by a fastening member, thus fitting the pump unit to the fuel tank.

The gasket is positioned on the flange portion, and the flange portion is pressed by an inside surface of the presser ring thereby collapsing the gasket. The collapsing amount is determined by the position at which the presser ring comes into contact with the fixed side ring. As such, the collapsing amount of the gasket is constant even if the fastening force of the fastening member is increased. When the fastening force of the fastening member is increased, only the connection between the fixed side ring and the presser ring is increased. A compressing force acting on the flange portion coincides with the springy force of the gasket. According to the present invention, the springy force of the gasket is fixed, thus preventing a situation where a compressing force beyond a certain level would be exerted on the flange portion. As such, generation of creep in the flange portion can be obviated, even when the flange portion is made of a resin.

As a result, sealing performance is stabilized, and a good seal can be maintained even under conditions of heavy vibration.

The present invention further includes a fixed side ring formed with first valley portions and first mount portions alternately provided by bending a steel sheet. The first valley portions are connected to the fuel tank, and the first mount portions are used as receiving surfaces for the presser ring. The presser ring is formed with second valley portions and second mount portions alternately provided by bending a steel sheet. These second valley portions are brought into contact with the first mount portions, and the flange portion of the pump unit is held by inside surfaces of the second mount portions.

In order to bring the presser ring into close contact with the fixed side ring and to appropriately press the flange portion by the presser ring, desired shapes are arranged by bending a sheet. Since the rings are formed from a sheet, a reduction in weight of the fixed side ring and the presser ring is possible.

The present invention further includes a flange portion of the pump unit made of a resin. As a result, a reduction of both the weight and the cost of the pump unit is accomplished.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Next, a mode for carrying out the present invention will be described referring to the attached drawings.

Figure 1:
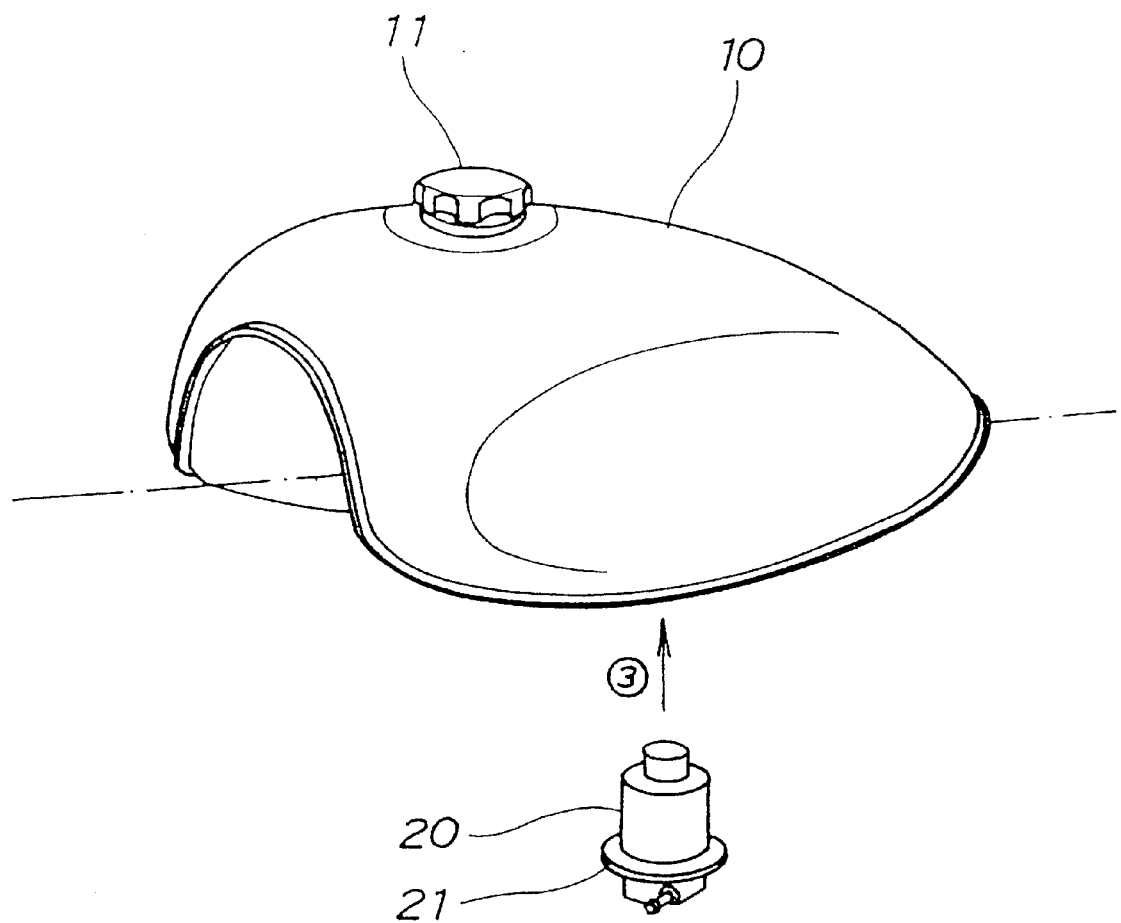
FIG. 1 is a conceptual illustration of a fuel tank and a pump unit according to the present invention.

FIG. 1 is a conceptual illustration of a fuel tank for an autobicycle and a pump unit according to the present invention, in which pump unit 20 is fitted, as indicated by arrow ③, to fuel tank 10 provided with fuel feed cap 11 at an upper portion. With flange portion 21 directed downwards, pump unit 20 is inserted upwards thereby fitting pump unit 20 to fuel tank 10. By this arrangement, the design of fuel tank 10 can be maintained.

In the following figures and description, pump unit 20 is inverted upside down for convenience.

Figure 2:
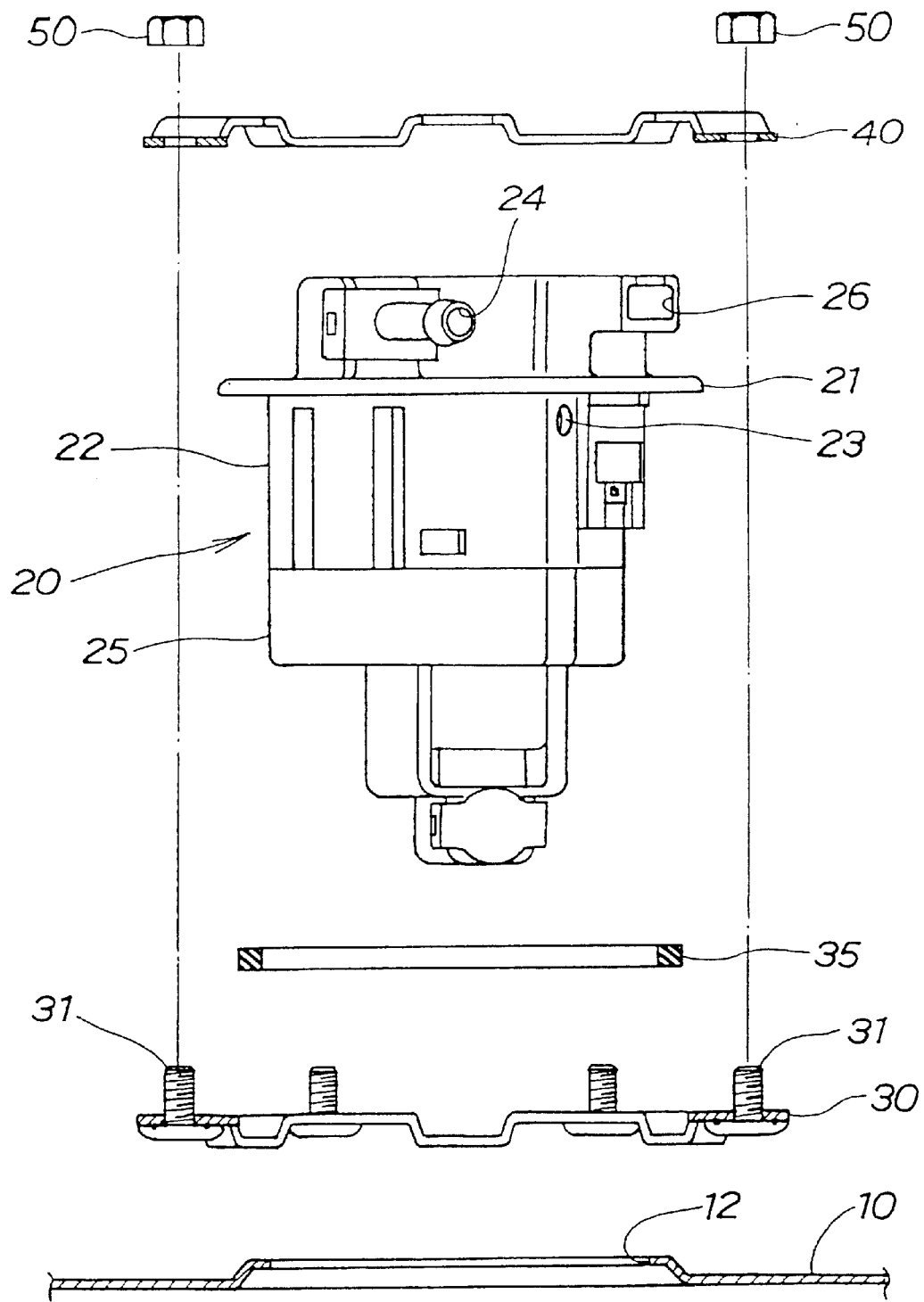
FIG. 2 is an exploded view of a tank fitting structure for a pump unit according to the present invention (First Embodiment)

FIG. 2 is an exploded view of a tank fitting structure for a pump unit according to the present invention (First Embodiment). The tank fitting structure for the pump unit includes a pump insertion hole 12 provided in fuel tank 10, fixed side ring 30 fitted to fuel tank 10 in the manner so as to surround pump insertion hole 12, and bolts 31 . . . ( . . . means a plurality, here and hereinafter) as part of the fastening member fitted by welding to fixed side ring 30. The tank fitting structure also includes gasket 35, pump unit 20 provided with flange portion 21, presser ring 40, and nuts 50 . . . as the remainder of the fastening member.

Describing pump unit 20 briefly, a motor pump and a strainer (both not shown) are incorporated in resin-made pump case 22 provided integrally with flange portion 21, and a fuel is drawn in through port 23, is pressurized by the motor pump, is filtered through the strainer, and then is ejected through discharge port 24. Numeral 25 denotes a cover, and 26 denotes a connector fitting port.

Figure 3:
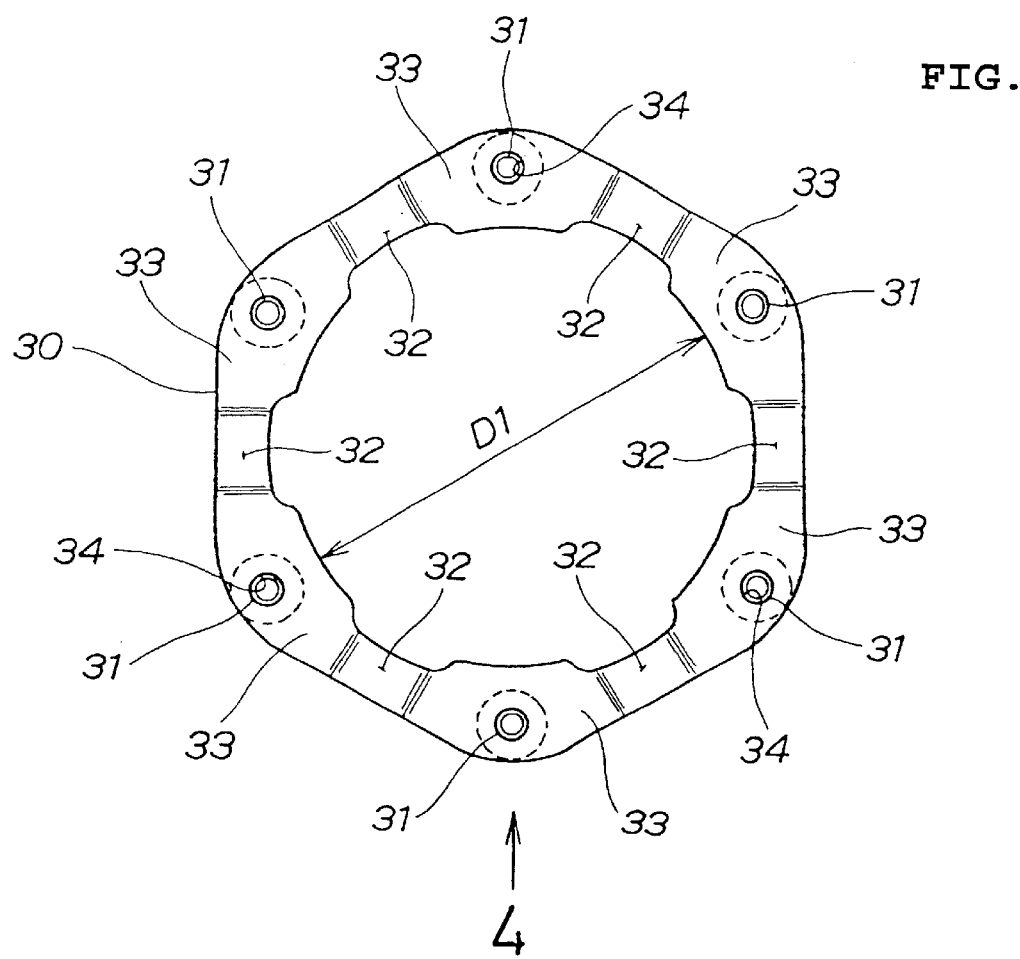
FIG. 3 is a plan view of a fixed side ring according to the present invention (First Embodiment)
Figure 4:
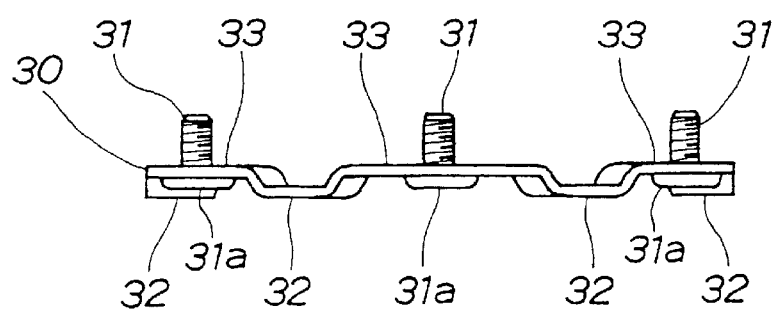
FIG. 4 is a view taken along arrow 4 of FIG. 3.

FIG. 3 is a plan view of the fixed side ring according to the present invention (First Embodiment), and FIG. 4 is a view taken along arrow 4 of FIG. 3.

Fixed side ring 30 comprises a plurality (for example, 6) of first valley portions 32 . . . and first mount portions 33 . . . alternately provided by press punching and bending of a steel sheet. Inside diameter D1 of fixed ring 30 is greater than the outside diameter of the gasket 35 (See FIG. 2). Each of first mount portions 33 is provided with a bolt hole 34, and bolt 31 is inserted in bolt hole 34 from the lower side. Head 31a of bolt 31 is preliminarily provided with a small projection for projection welding. An electric current is passed through the small projection while it is kept in contact with the lower side of first mount portion 33, concentrating the current to the small projection, thereby welding the two together. Welding by this method is called projection welding.

Figure 5:
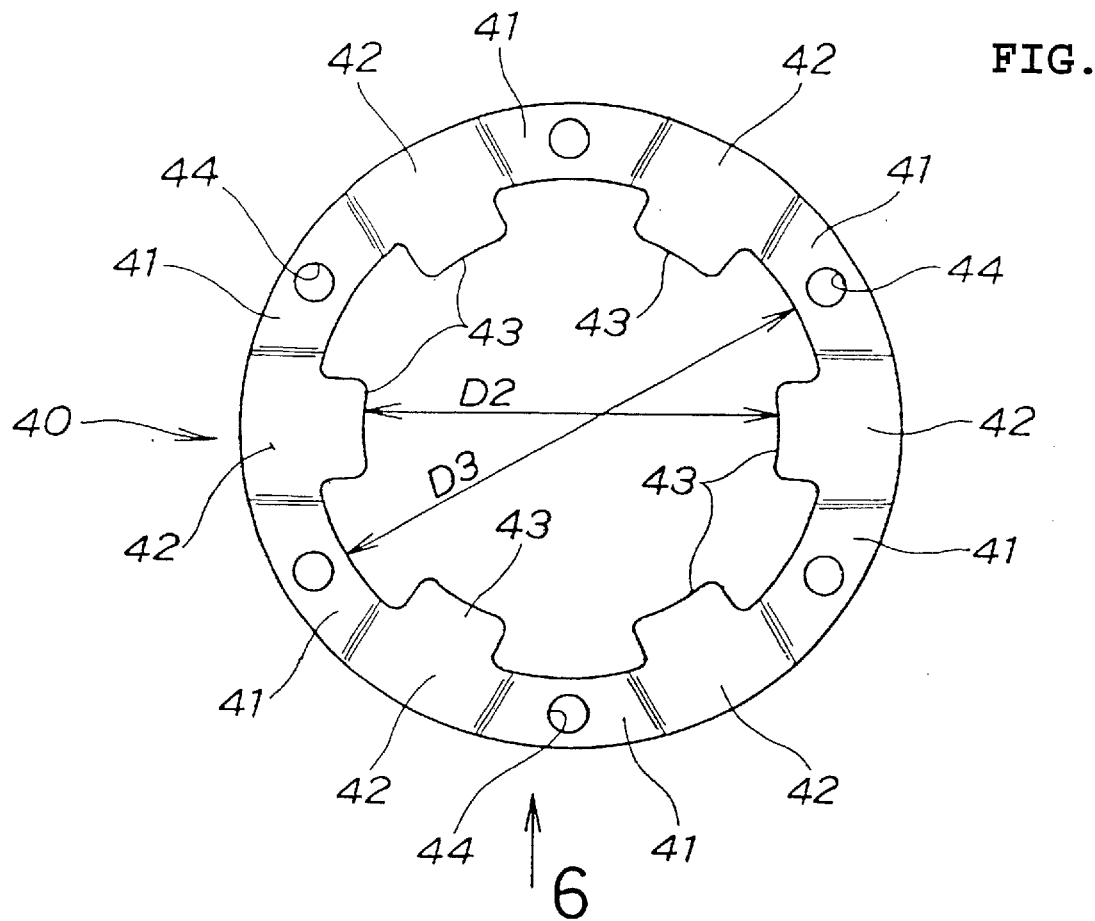
FIG. 5 is a plan view of a presser ring according to the present invention (First Embodiment)
Figure 6:
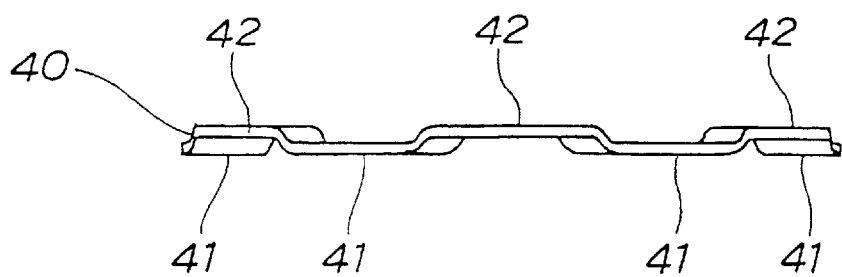
FIG. 6 is a view taken along arrow 6 of FIG. 5.

FIG. 5 is a plan view of a presser ring according to the present invention (First Embodiment), and FIG. 6 is a view taken along arrow 6 of FIG. 5.

Presser ring 40 is a formed product comprising pluralities (for example, 6) of second valley portions 41 . . . and second mount portions 42 . . . alternately provided by punching and bending a steel sheet, with presser piece portion 43 projected toward the center from each of the second mount portions 42. The second valley portions 41 . . . are provided with bolt holes 44 . . . . The minimum inside diameter D2 is smaller than the diameter of the flange portion 21 (See FIG. 2) of pump unit 20, and inside diameter D3 between second valley portions 41, 41 is slightly greater than the diameter of flange portion 21 (See FIG. 2).

While six presser piece portions 43 are intermittently shown in FIG. 5, presser piece portions 43 . . . may be contiguous with each other so that presser ring 40 has a uniform inside diameter D2. However, when presser piece portions 43 are intermittently provided as shown in FIG. 5, it is possible to prevent the generation of wrinkles at the time of press working. Thus, press forming is facilitated, and production cost can be reduced.

The purpose of the fixed side ring and the presser ring according to First Embodiment will be described referring to FIGS. 7 to 9.

Figure 7:
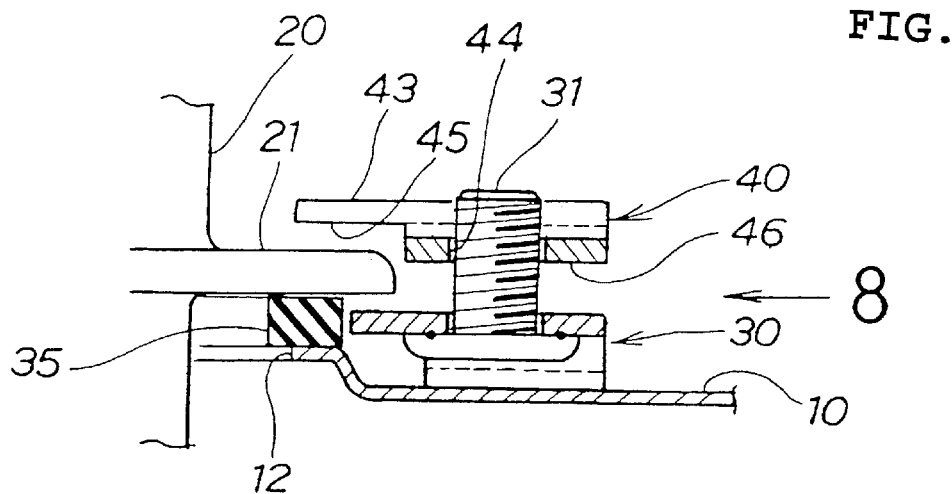
FIG. 7 is a view showing a tank fitting procedure for a fuel pump according to the present invention (First Embodiment)

FIG. 7 is a tank fitting procedure of a fuel pump according to the present invention (First Embodiment). Gasket 35 is positioned on an edge of pump insertion hole 12 of fuel tank 10, but fixed side ring 30 is preliminarily fitted to fuel tank 10 at a position surrounding gasket 35. A major part of pump unit 20 is inserted into fuel tank 10 through pump insertion hole 12 while placing flange portion 21 projected from pump unit 20 on gasket 35.

Next, while the inside surface 45 (corresponding to the lower surface of the presser piece portions 43) of presser ring 40 is caused to face flange portion 21, bolt hole 44 of presser ring 40 is fitted to bolt 31. This causes the outside surface 46 of presser ring 40 to face fixed side ring 30.

Figure 8:
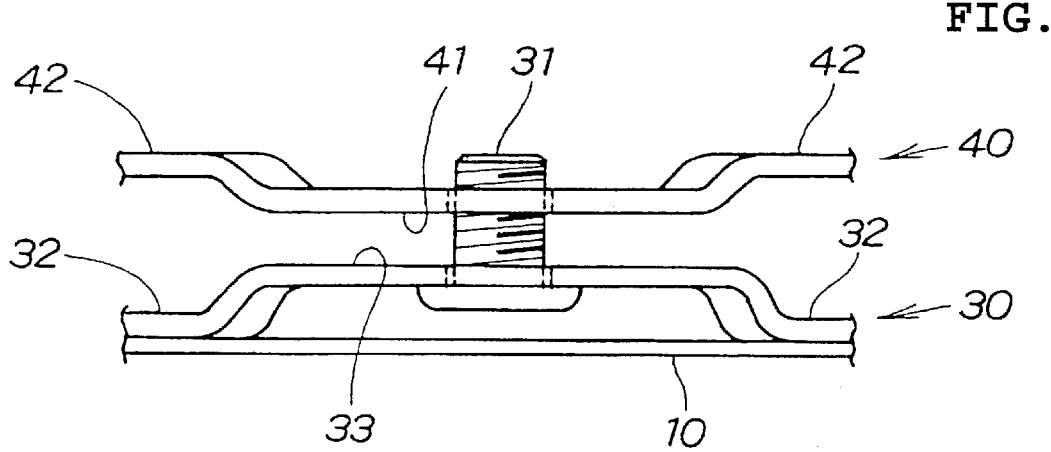
FIG. 8 is a view taken along arrow 8 of FIG. 7.

FIG. 8 is a view taken along arrow 8 of FIG. 7, and shows the condition where first valley portions 32, 32 of fixed side ring 30 are preliminarily welded to fuel tank 10, and where second valley portion 41 of presser ring 40 faces first mount portion 33 of fixed side ring 30.

Figure 9:
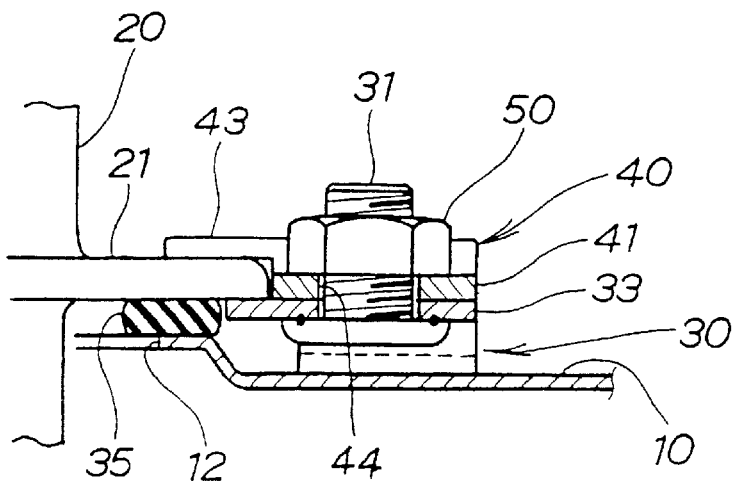
FIG. 9 is a view showing a tank fitting structure for a fuel tank according to the present invention (First Embodiment)

FIG. 9 is a view showing the tank fitting structure for the fuel tank according to the present invention (First Embodiment), and shows the condition where the second valley portion 41 is brought into close contact with first mount portion 33 by fastening nut 50 onto bolt 31. At this time, gasket 35 is appropriately collapsed by presser piece portion 43 of presser ring 40 through flange portion 21, so that sealing performance of gasket 35 can be effectively achieved.

Here, it is important that even when nut 50 is tightened further, the collapsing amount of gasket 35 is not substantially changed. This is because second valley portion 41 is in contact with first mount portion 33. Accordingly, when a further tightening of nut 50 is necessary for increasing the fastening force between fixed side ring 30 and presser ring 40, the collapsing amount of gasket 35 is not affected by this further tightening force.

The collapsing amount of gasket 35 has an optimum value determined according to the material and cross-sectional shape. If the collapsing amount is deviated from the optimum value by more than a certain value, reduction of the sealing performance or breakage of the gasket will occur. In view of this, according to the present invention, the collapsing amount of gasket 35 can be maintained at a fixed level, so that a good sealing performance can be maintained. Since the collapsing amount of gasket 35 is fixed, the compressing force acting on flange portion 21 is also fixed. Since there is no possibility that the compressing force will be abruptly increased, flange portion 21 can be made from a resin.

In addition, presser ring 40 can be securely fastened to fixed side ring 30 by bolt 31 and nut 50 as fastening members, and, as such, there is no possibility that the fastening members will become loosened, even under conditions with heavy vibrations. Therefore, the fitting structure according to the present invention is suitable for a tank fitting structure for a fuel pump in an autobicycle subject to receiving large vibrations. The structure is particularly suitable where pump unit 20 is inserted into fuel tank 10 from the lower side as shown in FIG. 1. This fitting structure may also be applied to three- or four-wheel vehicles.

Another embodiment of the present invention will be described next.

Figure 10:
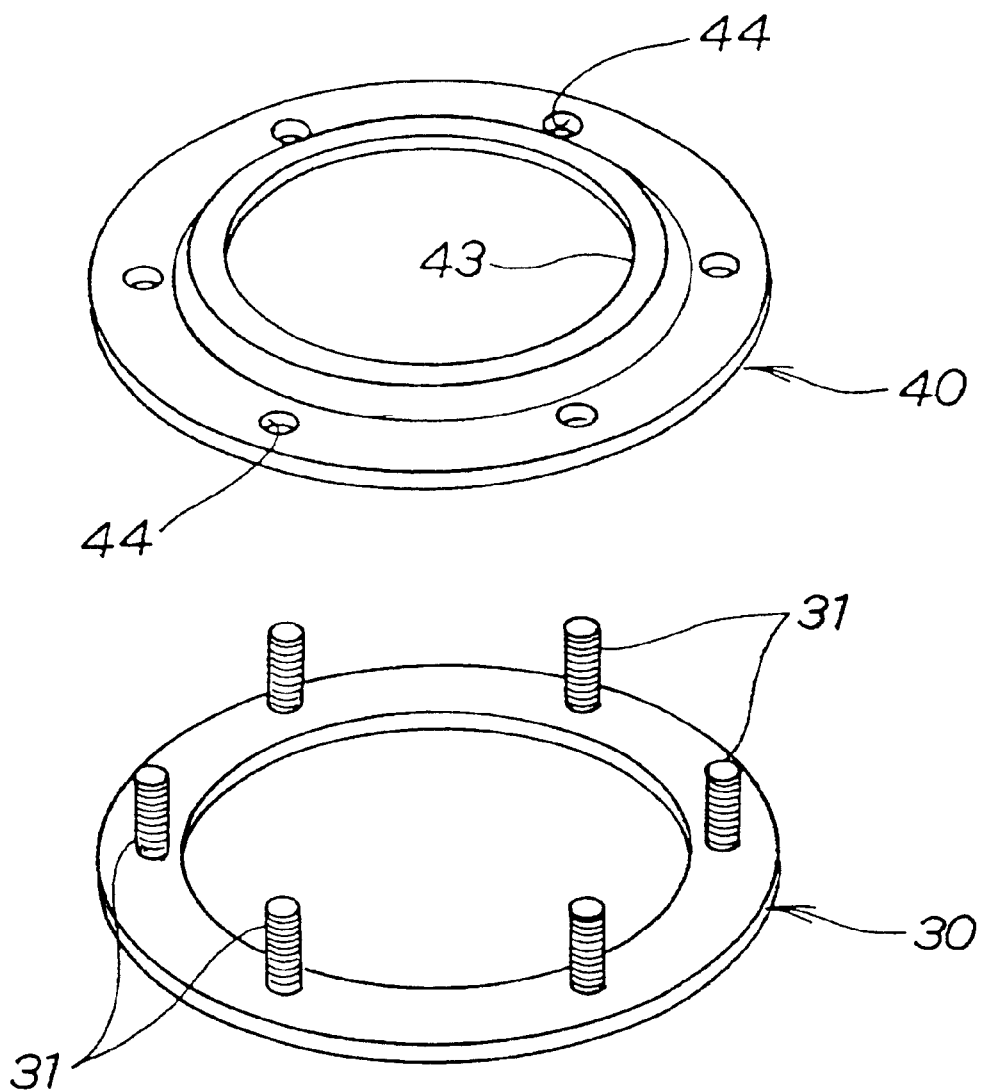
FIG. 10 is a perspective view of a fixed side ring and a presser ring according to Second Embodiment of the present invention.

FIG. 10 is a perspective view of a fixed side ring and a presser ring according to Second Embodiment of the present invention. Fixed side ring 30 is a steel plate ring with bolts 31 . . . fitted thereto in an upward pose. Presser ring 40 is a steel plate ring having bolt holes 44 . . . and presser piece portion 43.

Figure 11A:
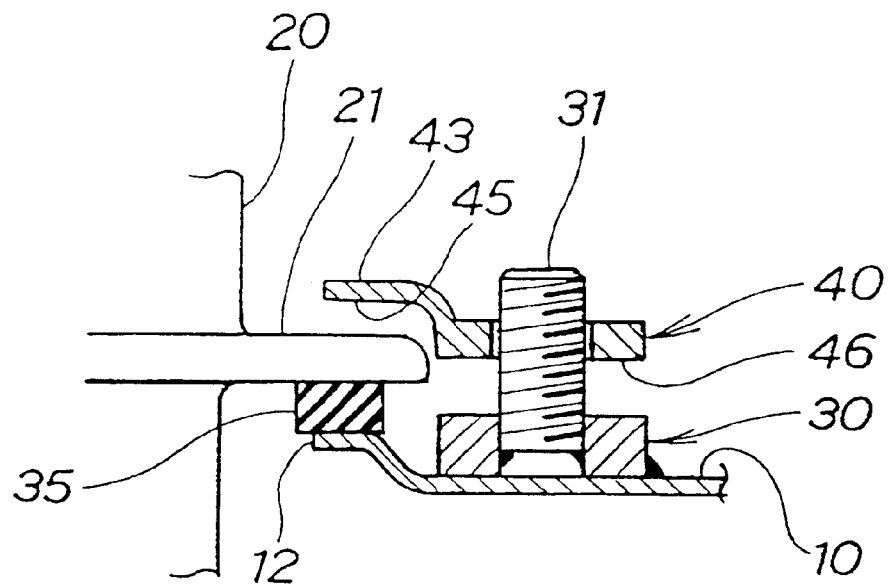
FIGS. 11(a) and 11(b) are views showing a tank fitting procedure for a fuel pump according to the present invention (Second Embodiment)
Figure 11B:
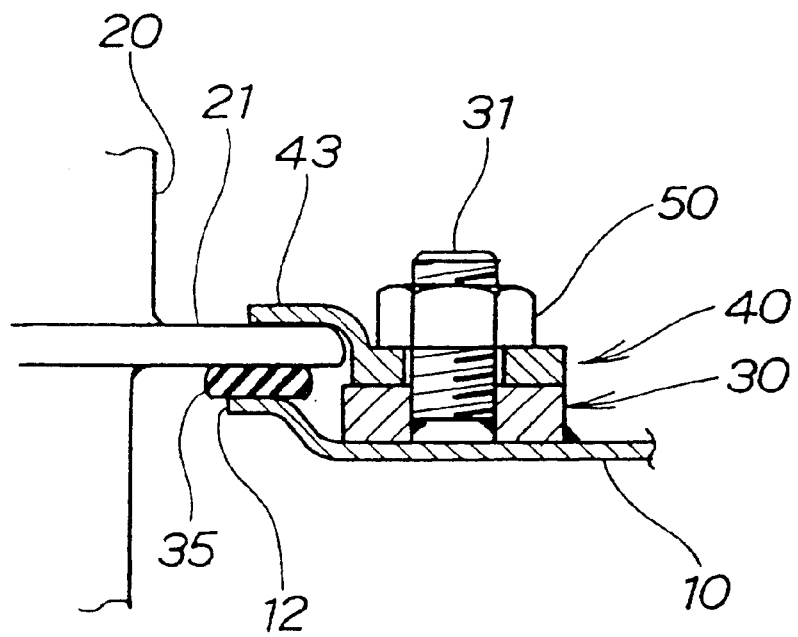

FIGS. 11(a) and 11(b) are views of a tank fitting procedure for a fuel tank according to the present invention (Second Embodiment).

In FIG. 11(a), gasket 35 is placed on an edge of pump insertion hole 12 provided in fuel tank 10. Fixed side ring 30 is preliminarily fitted to fuel tank 10 at a position surrounding gasket 35. A major part of pump unit 20 is inserted into fuel tank 10 through pump insertion hole 12 while placing flange portion 21 projected from pump unit 20 on the gasket 35.

Next, bolt hole 44 of presser ring 40 is fitted to bolt 31. This causes inside surface 45 (corresponding to the lower surface of the presser piece portion 43) of presser ring 40 to face flange portion 21, and causes outside surface 46 of presser ring 40 to face fixed side ring 30.

In FIG. 11(b), nut 50 is fastened onto bolt 31, whereby presser ring 40 is brought into close contact with fixed side ring 30. As a result, gasket 35 is appropriately collapsed by presser ring 40 through flange portion 21, causing the sealing performance of gasket 35 to be effectively achieved.

Figure 12:
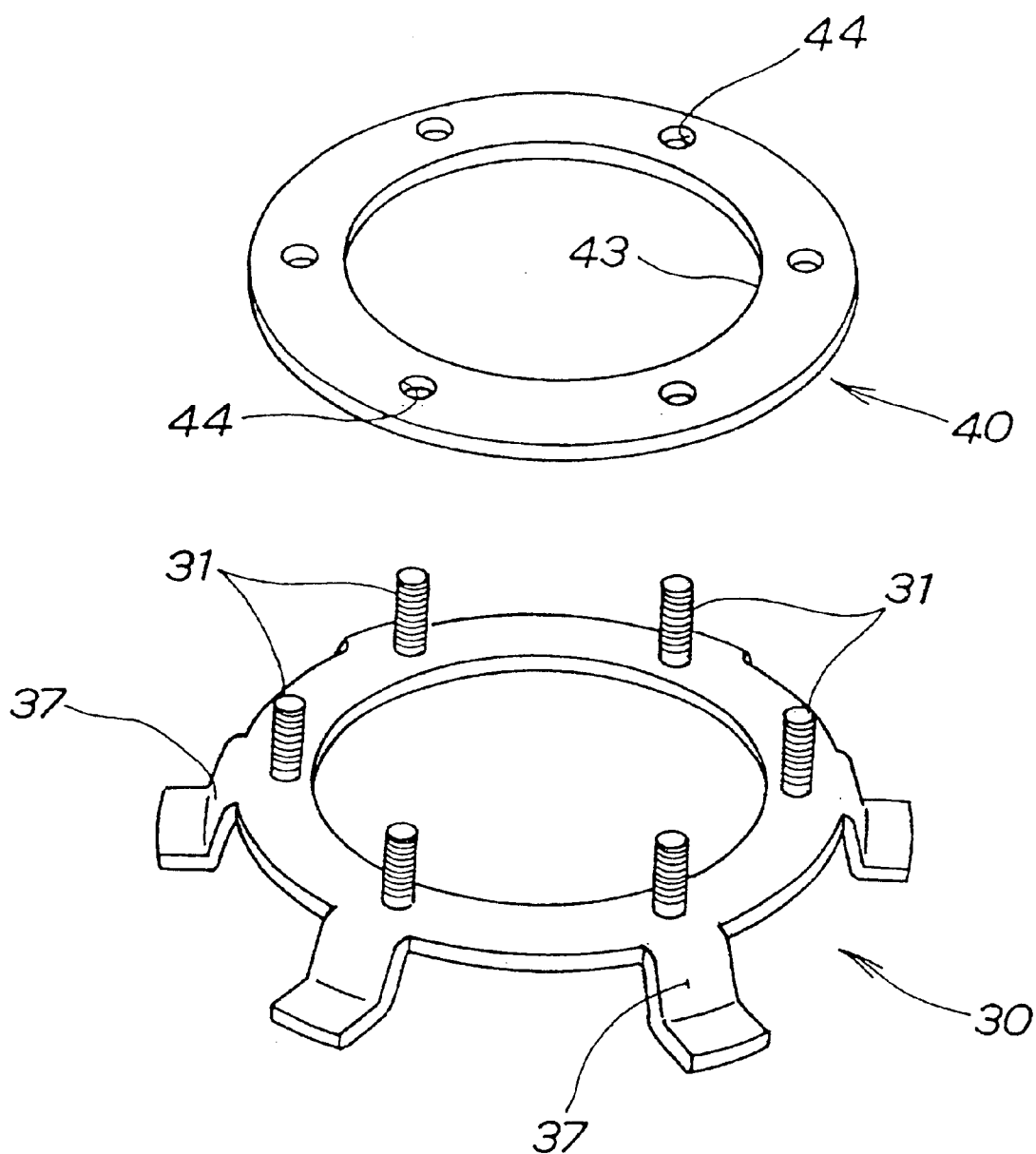
FIG. 12 is a perspective view of a fixed side ring and a presser ring according to Third Embodiment of the present invention.

FIG. 12 is a perspective view of a fixed side ring and a presser ring according to Third Embodiment of the present invention. Fixed side ring 30 is a steel plate ring provided with legs 37 . . . , and bolts 31 . . . fitted thereto in an upward pose. Presser ring 40 is a steel plate ring having bolt holes 44 . . . and a presser piece portion 43. Since fixed side ring 30 is provided with legs 37 . . . , reductions in material thickness and weight of fixed side ring 30 can be achieved.

Figure 13A:
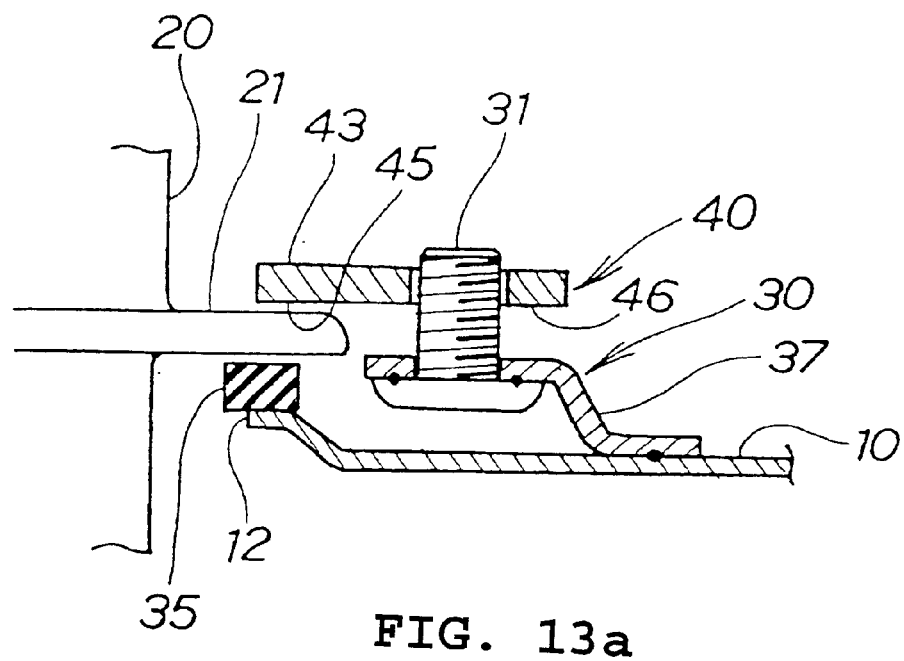
FIGS. 13(a) and 13(b) are views showing a tank fitting procedure for a fuel tank according to the present invention (Third Embodiment)
Figure 13B:
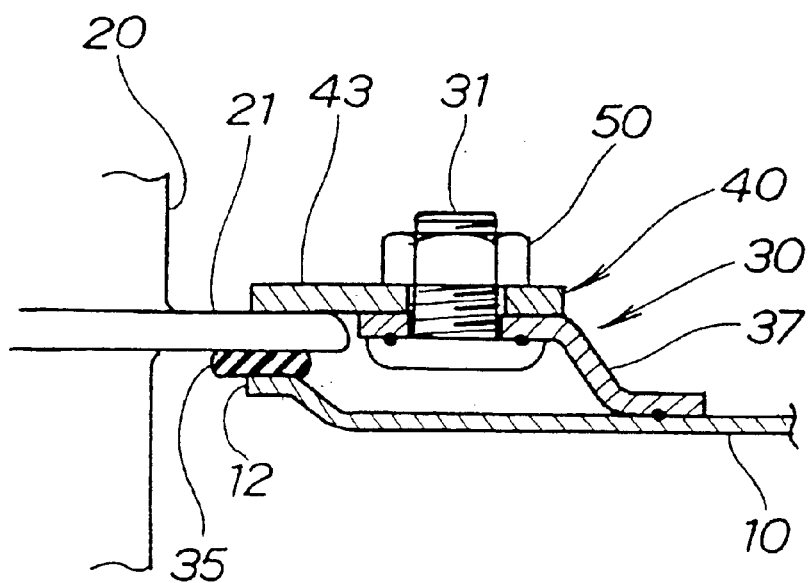
Figure 14A:
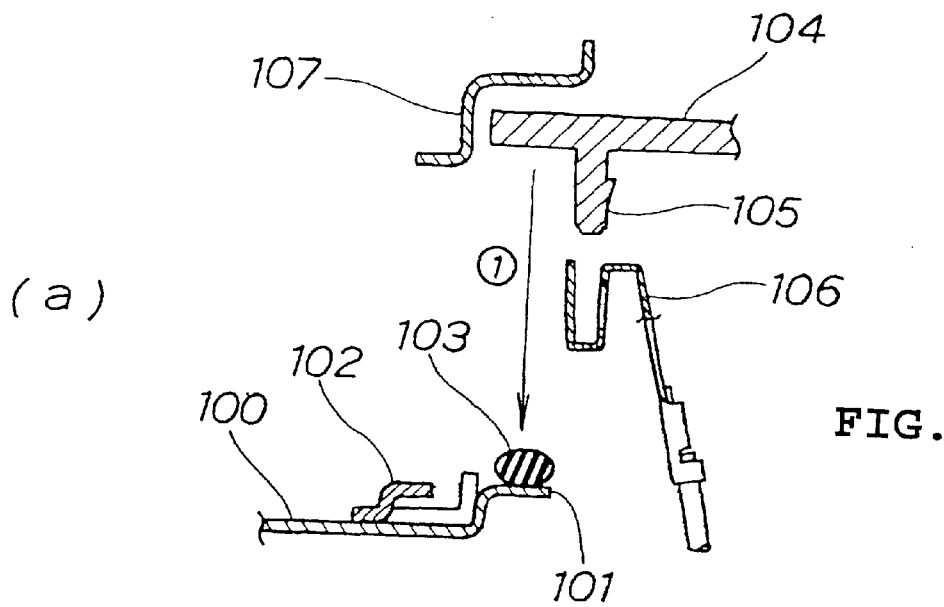
FIGS. 14(a)–14(c) are reprints of FIG. 31 of Japanese Pre-examination Patent Publication (KOKAI) No. 8-232792 (1996) and an illustration of mounting.
Figure 14B:
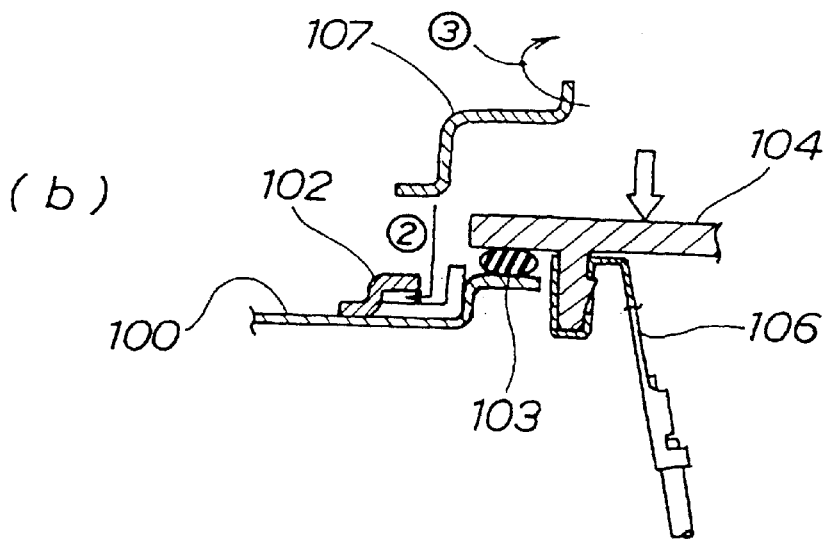
Figure 14C:
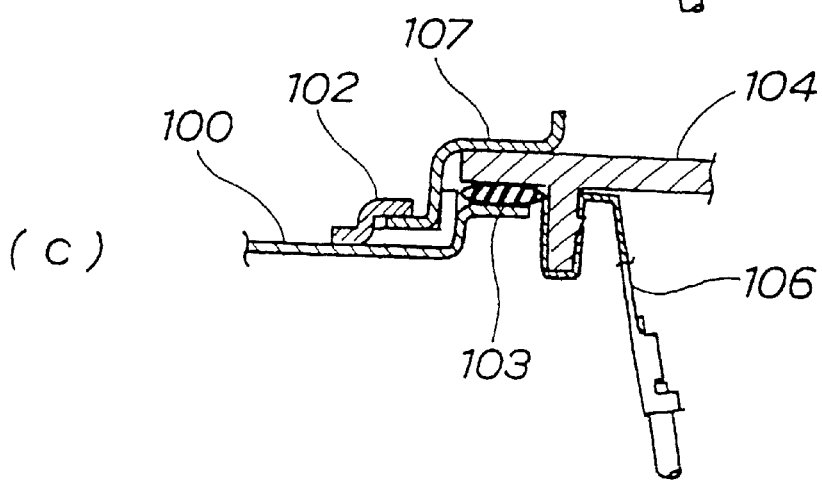

FIGS. 13(a) and 13(b) are views showing the tank fitting procedure of a fuel pump according to the present invention (Third Embodiment).

In FIG. 13(a), gasket 35 is put on an edge of pump insertion hole 12 provided in fuel tank 10, and fixed side ring 30 is preliminarily fitted to fuel tank 10 at a position so as to surround gasket 35. A major part of pump unit 20 is inserted into fuel tank 10 through pump insertion hole 12 while placing flange portion 21 projected from pump unit 20 on gasket 35.

Next, bolt hole 44 of presser ring 40 is fitted to bolt 31 while causing the inside surface 45 (corresponding to the lower surface of the presser piece portion 43) of presser ring 40 to face flange portion 21. This causes outside surface 46 of presser ring 40 to face fixed side ring 30.

In FIG. 13(b), nut 50 is fastened onto bolt 31, whereby the presser ring 40 is brought into close contact with fixed side ring 30. As a result, gasket 35 is appropriately collapsed by presser ring 40 through flange portion 21, so that sealing performance of gasket 35 can be achieved.

The fastening member exemplified by bolt 31 and nut 50 may be any member of any kind that can display an action of pressing the presser ring against the fixed side ring.

The fitting structure according to the present invention can be applied to any of a system in which the pump unit is inserted into the fuel tank downwards from the upper side, a system in which the pump unit is inserted into the fuel tank upwards from the lower side, and a system in which the pump unit is inserted into the fuel tank in a lateral direction.

The present invention, with the above constitution, displays the following effects.

According to the present invention, a flange portion is placed on a gasket positioned on an edge of a pump insertion hole of a fuel tank. The gasket is collapsed by pressing the flange portion by the inside surface of a presser ring, wherein the collapsing amount is determined by a position at which presser ring comes into contact with a fixed side ring. Thus, even if the tightening force to the fastening member is increased so as to further tighten the presser ring to the fixed side ring, the collapsing amount of the gasket is not changed. The compressing force exerted on the flange portion coincides with the springy force of the gasket. Thus, the springy force of the gasket is fixed, such that a compressing force more than a certain level cannot be exerted on the flange portion. As such, it is possible to prevent the generation of creep deformation to the flange, even when the flange portion is made from a resin. Moreover, sealing performance is stabilized, and a good sealing performance can be achieved even under conditions of heavy vibrations.

The present invention also includes a fixed side ring formed having first valley portions and first mount portions alternately provided by bending a steel sheet. The first valley portions are connected to the fuel tank, and the first mount portions are used as receiving surfaces for the presser ring. The presser ring is formed to have second valley portions and second mount portions alternately provided by bending a steel sheet. The second valley portions are brought into contact with the first mount portions, and the flange portion of the pump unit is held by inside surfaces of the second mount portions. In order to bring the presser ring into close contact with the fixed side ring and to appropriately hold the flange portion by the presser ring, desired shapes are adjusted by bending a sheet. Since the fixed side ring and the presser ring are each made from a sheet plate, a reduction in weight of rings can be achieved.

In addition, the present invention includes a flange portion of the pump unit formed from a resin. As a result, a reduction in both the weight and the cost of the pump unit can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A tank fitting structure for a fuel pump, comprising:
   a gasket positioned on an edge of a pump insertion hole provided in a fuel tank;
   a fixed side ring preliminarily fitted to said fuel tank at a position for surrounding said gasket;
   a pump unit, a major part of which is inserted into said fuel tank through said pump insertion hole while placing a flange portion projected from said pump unit on said gasket; and
   a presser ring having an inside surface and an outer surface,
      wherein said inside surface is placed on said flange portion, and said outside surface is caused to face said fixed side ring, and
      wherein said outside surface of said presser ring is brought into close contact with said fixed side ring by a fastening member, thereby fitting said pump unit to said fuel tank.

2. The tank fitting structure for a fuel pump as set forth in claim 1,
   wherein said fixed side ring is a formed ring comprising first valley portions and first mount portions alternately provided by bending a steel sheet, said first valley portions are connected to said fuel tank, and said first mount portions are used as receiving surfaces for said presser ring,
   said presser ring is a formed ring comprising second valley portions and second mount portions are alternately provided by bending a steel sheet, said second valley portions are brought into contact with said first mount portions, and
   said flange portion of said pump unit is held by inside surfaces of said second mount portions.

3. The tank fitting structure for a fuel tank as set forth in claim 1, wherein said flange portion of said pump unit is formed of a resin.

4. The tank fitting structure for a fuel tank as set forth in claim 1, wherein said fastening member is a plurality of nuts and bolts.

5. The tank fitting structure for a fuel tank as set forth in claim 4, wherein heads of said bolts are secured to said fixed side ring by welding.

6. The tank fitting structure for a fuel tank as set forth in claim 2, wherein first valley portions are connected to said fuel tank by welding.

7. The tank fitting structure for a fuel pump, comprising:
   a circular gasket positioned on an edge of a pump insertion hole provided in a fuel tank;
   a fixed side ring preliminarily welded to said fuel tank at a position for surrounding said gasket;
   a pump unit, a major part of which is inserted into said fuel tank through said pump insertion hole while placing a flange portion projected from said pump unit on said gasket; and
   a presser ring having an inside surface and an outer surface,
      wherein said inside surface is placed on said flange portion, and said outside surface is caused to face said fixed side ring, and
      wherein said outside surface of said presser ring is brought into close contact with said fixed side ring by a fastening member, thereby fitting said pump unit to said fuel tank.

8. The tank fitting structure for a fuel pump as set forth in claim 7,
   wherein said fixed side ring is a flat ring with bolt holes formed from a steel plate,
   said presser ring is a ring with bolt holes, said presser ring has a raised presser piece portion formed on its inner circumference, and
   said flange portion of said pump unit is held by an inside surface of said presser piece portion.

9. The tank fitting structure for a fuel tank as set forth in claim 7, wherein said flange portion of said pump unit is formed of a resin.

10. The tank fitting structure for a fuel tank as set forth in claim 7, wherein said fastening member is a plurality of nuts and bolts.

11. The tank fitting structure for a fuel tank as set forth in claim 10, wherein heads of said bolts are secured to said fixed side ring by welding.

* * * * *